(No Model.) 2 Sheets—Sheet 1.

A. E. MOREY.
SUSPENSION WHEEL.

No. 563,782. Patented July 14, 1896.

WITNESSES
J. H. Phelps.
C. E. Humphrey

By His ATTORNEY

INVENTOR:
Albert E. Morey,
C. P. Humphrey (No Model.)  2 Sheets—Sheet 2.

A. E. MOREY.
SUSPENSION WHEEL.

No. 563,782.  Patented July 14, 1896.

WITNESSES
J. N. Phelps
C. E. Humphrey

By His ATTORNEY

INVENTOR:
Albert E. Morey,
C. P. Humphrey

THE NORRIS PETERS CO., PHOTO-LITHO., WASHINGTON, D. C.

UNITED STATES PATENT OFFICE.

ALBERT E. MOREY, OF COVINGTON, KENTUCKY, ASSIGNOR TO THE EUCLID MANUFACTURING COMPANY, OF CINCINNATI, OHIO.

SUSPENSION-WHEEL.

SPECIFICATION forming part of Letters Patent No. 563,782, dated July 14, 1896.

Application filed November 27, 1895. Serial No. 570,313. (No model.)

*To all whom it may concern:*

Be it known that I, ALBERT E. MOREY, a citizen of the United States, residing at Covington, in the county of Kenton and State of Kentucky, have invented a certain new and useful Improvement in Suspension-Wheels, of which the following is a specification.

My invention has relation to improvements in the construction of wheels, pulleys, &c., and has especial relation to that class which are known as "suspension-wheels."

The objects of my invention are to produce a strong serviceable wheel in which the adjustment of each spoke is independent of the remainder, and in which all adjusting-nuts are locked against unscrewing, in which a removable bushing is used, enabling the wheel or pulley to be used on shafts of different diameter, and to be easily replaced when worn, and generally to provide a wheel to meet all the requirements of those who desire a wheel readily adjustable, and of great strength and wearing qualities.

Wheels constructed in the manner hereinafter described can be used for almost all purposes to which a wheel can be placed, including carriages, wagons, wheelbarrows, farming and harvesting machines, pulleys, street-cars, &c.

To the aforesaid objects my invention consists in the peculiar and novel construction, combination, and arrangement of the various parts hereinafter described, and then specifically claimed, reference being had to the accompanying drawings, forming a part of this specification.

Figure 1:
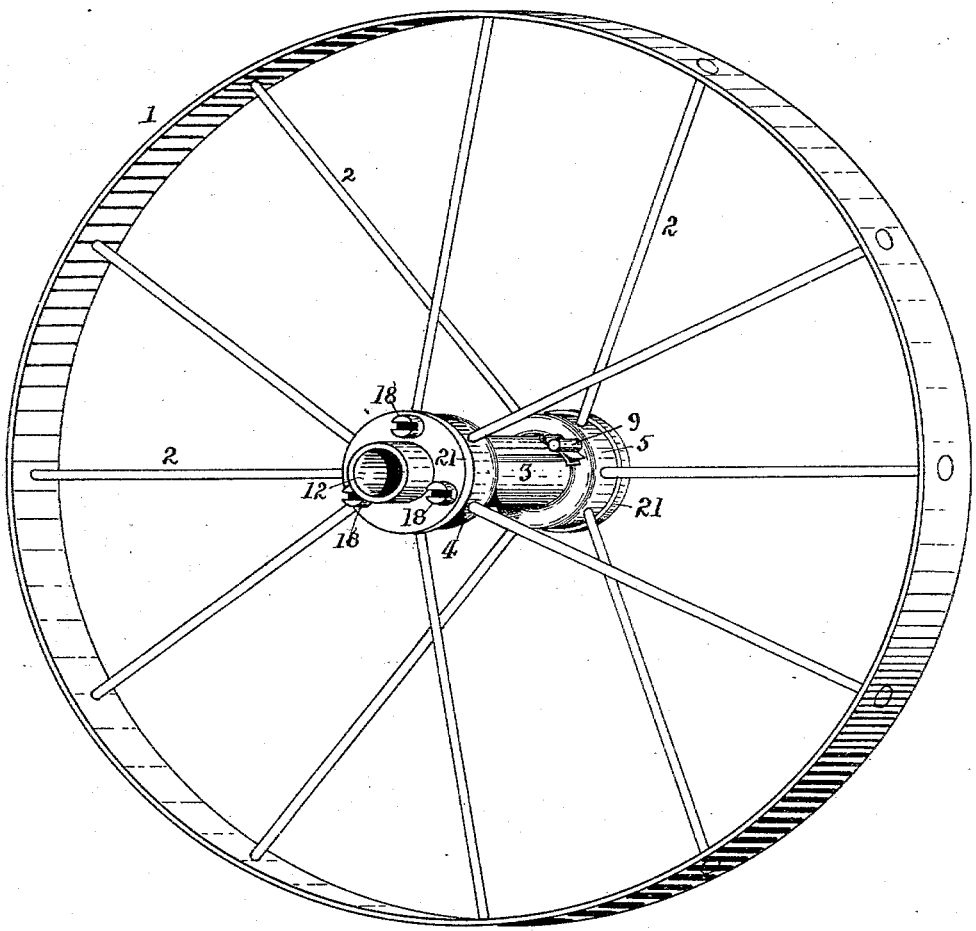
Figure 2:
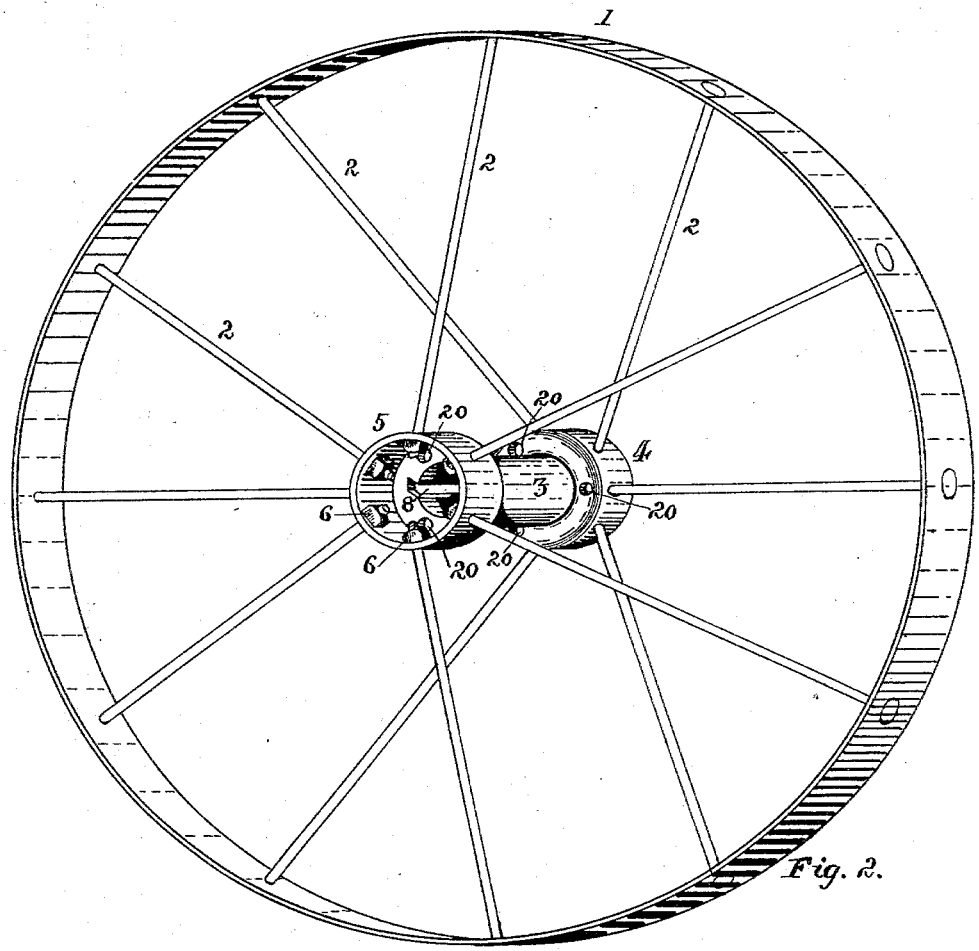
Figure 3:
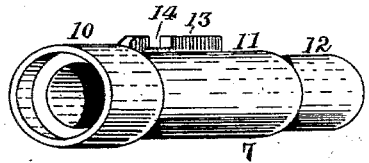
Figure 4:
Figure 5:
Figure 6:
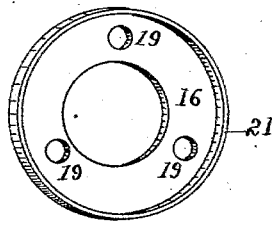

In the accompanying drawings, in which similar reference-numerals indicate like parts in the different views, Figure 1 is a perspective of my complete wheel; Fig. 2, a reverse of Fig. 1 with the bushing and side disks removed, showing the skeleton wheel with its hub; Fig. 3, a perspective of the bushing I use; Fig. 4, a spring-key used in the construction of the wheel; Fig. 5, one form of cap-screw I prefer to use; Fig. 6, one of the annular side disks.

In the drawings, 1 is the wheel-rim, with countersunk holes for spokes 2, which are simply bolts of preferred size, with countersunk heads. These spokes all point outward from the plane of the rim, as usual with all suspension-wheels.

The hub is substantially a short sleeve 3, terminating in enlarged ends 4 and 5, which are perforated at determinate intervals. Through these perforations the spokes 2 are passed and are drawn tight by nuts 6 on the inside of these flaring heads 4 5, thus enabling each individual spoke to be tightened or loosened to such an extent as will bring the rim perfectly true.

The sleeve 3 has a keyway 8 cut clear across its smaller middle part and entering each enlarged end. (See Fig. 2.) Directly over this keyway 8 and projecting from enlarged end 5 of hub 3 is a short stud 9, for a purpose to be described.

The bore of the sleeve or hub 3 is larger than the diameter of the shaft or spindle on which it is to be used. This space is occupied by a bushing 7. This bushing 7 may be cylindrical or tapered on its interior, as desired. Its exterior has three diameters or sizes, the larger 10, middle portion 11, and small end 12. On the middle part 11 is a longitudinal key 13, having a notch 14. This bushing 7 is held in the hub as follows: The end 12 of the bushing is inserted in the end 5 of the hub, it being turned so that the key 13 will enter the keyway 8. The bushing is pushed forward till the shoulder between part 10 and 11 of the bushing strikes against the shoulder formed by the sleeve 3, meeting the enlarged end 5. The notch 14 is then directly under the stud 9. Then the spring-key 15, Fig. 4, is driven between them, and its upper half is bent around the stud 9, thus completely locking the bushing against withdrawal. Now the two annular disks 16 and 17, being perforated centrally to slide over their respective ends of the bushing, are placed on the outer ends of this bushing and held there by the screws 18, Fig. 5, passing through the perforations 19 in the disks and into holes 20 in the shoulders of the heads 4 and 5.

The disks 16 and 17 have an annular flange 21 at right angles to their faces, which fits snugly over the flaring heads 4 and 5.

There are four reasons for having the flange 21 fit over the heads 4 and 5, namely: First, it keeps the dust and dirt out of the interior between the bushing and hub; second, it serves to equalize and distribute the strain of the spokes upon the flaring portion of the hub, thereby strengthening it; third, all the nuts 6 are square and are turned with one flat face outwardly, and the disks being drawn up nearly to them prevent their turning, thus locking all of them from becoming loose; fourth, as the central perforation is made to fit closely over its respective end of the bushing, it thereby (being held tight to the hub) serves to prevent any side motion or bending of the bushing.

I do not confine myself to the use of a single set of spokes for a wheel, as pulleys having a wide face can be made with a number of sets of spokes at determinate distances, with a single long bushing or separate bushing for each set of spokes.

What I claim is—

1. A suspension-wheel having an outer rim and radial spokes, a hub consisting of a short sleeve having perforated enlarged ends, said spokes arranged to enter said perforations, nuts within said ends adapted to tighten said spokes, a bushing to fit in said hub, bearing a longitudinal key arranged to enter a corresponding keyway in said hub, said key having a transverse notch, and a stud projecting from one of the enlarged ends of said hub immediately over said notch, and a spring-key adapted to be driven through said notch under said stud and block the removal of said bushing, substantially as shown and described.

2. A suspension wheel or pulley having an outer rim and spokes, a hollow hub having enlarged perforated ends, said spokes entering said perforations, nuts within said enlarged ends adapted to tighten said spokes, a bushing to fit in said hub and having a notched key to enter a corresponding keyway in said hub, and a spring-key locking said bushing against removal, and two annular disks arranged to fit over their respective ends of said bushing and inclose the enlarged ends of said hub, said disks being removably fastened to said hub in such proximity as to prevent the turning of said nuts, substantially as shown and described.

In testimony that I claim the above I hereunto set my hand.

ALBERT E. MOREY.

In presence of—
  C. E. HUMPHREY,
  C. P. HUMPHREY.